United States Patent
Lee

(10) Patent No.: US 8,259,051 B2
(45) Date of Patent: *Sep. 4, 2012

(54) LIQUID CRYSTAL DISPLAY

(75) Inventor: Baek-Woon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,111

(22) Filed: Aug. 25, 2011

(65) Prior Publication Data

US 2011/0299023 A1   Dec. 8, 2011

Related U.S. Application Data

(63) Continuation of application No. 12/768,629, filed on Apr. 27, 2010, which is a continuation of application No. 10/553,501, filed as application No. PCT/KR2004/000882 on Apr. 16, 2004, now Pat. No. 7,710,374.

(30) Foreign Application Priority Data

Apr. 17, 2003   (KR) .................. 10-2003-0024375

(51) Int. Cl.
    *G09G 3/36*   (2006.01)

(52) U.S. Cl. ............... 345/93; 345/87; 345/88; 345/90; 345/92

(58) Field of Classification Search .............. 345/55, 345/84, 87, 88, 90, 92, 93, 204, 205, 206, 345/690, 694

See application file for complete search history.

(56) References Cited

U.S. PATENT DOCUMENTS

| 4,800,375 A | 1/1989 | Silverstein et al. |
|---|---|---|
| 4,892,391 A | 1/1990 | Stewart et al. |
| 5,436,635 A | 7/1995 | Takahara et al. |
| 5,949,396 A | 9/1999 | Lee |
| 6,140,990 A | 10/2000 | Schlig |
| 6,259,504 B1 | 7/2001 | Shin et al. |
| 6,335,719 B1 | 1/2002 | An et al. |
| 6,429,842 B1 | 8/2002 | Shin et al. |
| 6,512,505 B1 | 1/2003 | Uchino et al. |
| 6,833,888 B2 | 12/2004 | Song et al. |
| 6,891,522 B2 | 5/2005 | Song et al. |
| 7,075,601 B2 | 7/2006 | Hong et al. |

(Continued)

FOREIGN PATENT DOCUMENTS

| JP | 10-333131 A | 12/1998 |
|---|---|---|
| JP | 2000-131666 A | 5/2000 |

(Continued)

*Primary Examiner* — My-Chau T Tran

(74) *Attorney, Agent, or Firm* — Innovation Counsel LLP

(57) ABSTRACT

A liquid crystal display includes a plurality of subpixels respectively having switching elements and arranged in a matrix, a plurality of gate lines connected to the subpixels via the switching elements and transmitting a gate signal for turning on or off the switching elements, and a plurality of data lines connected to the subpixels via the switching elements and transmitting a data voltage. The respective subpixels are located in areas defined by two adjacent gate lines and two adjacent data lines, which are uniquely connected to a pair of gate line and data line, and at least one of the subpixels is connected to the different gate lines or the data line positioned at opposite side with respect to the other subpixel of the same row. In this case, a pair of subpixels adjacent above and below are connected to the gate line therebetween or the gate lines positioned at opposite side each other. In this way, any inversions for each color can be performed without changing conventional driving ICs.

20 Claims, 11 Drawing Sheets

U.S. PATENT DOCUMENTS

| | | |
|---|---|---|
| 7,113,159 B2 | 9/2006 | Sawabe |
| 7,259,755 B1 | 8/2007 | Ahn |
| 7,701,476 B2 | 4/2010 | Brown et al. |
| 7,710,374 B2 * | 5/2010 | Lee .................................. 345/88 |
| 2003/0151584 A1 | 8/2003 | Song et al. |
| 2004/0239602 A1 | 12/2004 | Kim et al. |
| 2006/0061534 A1 | 3/2006 | Lee |

FOREIGN PATENT DOCUMENTS

| | | |
|---|---|---|
| JP | 2006-084860 A | 3/2006 |
| JP | 2006-259135 A | 9/2006 |
| JP | 2007-079544 A | 3/2007 |
| WO | 2004-092812 A | 10/2004 |
| WO | 2007-063620 A | 6/2007 |

* cited by examiner

LIQUID CRYSTAL DISPLAY

CROSS REFERENCE TO RELATED APPLICATION

This application is a continuation of U.S. patent application Ser. No. 12/768,629, filed Apr. 27, 2010, which is a continuation of U.S. patent application Ser. No. 10/553,501, filed on Oct. 17, 2005, which is a National Stage Entry of PCT/KR04/00882 filed on Apr. 16, 2004, now WO 2004/09812 published on Oct. 28, 2004, which claims priority to Korean patent application number 10-2003-0024375 filed on Apr. 17, 2003, the contents of which are all incorporated herein in their entirety by their references.

BACKGROUND OF THE INVENTION

1. Technical Field

The present invention relates to a liquid crystal display, and, in particular, to a liquid crystal display performing an inversion driving.

2. Background Art

A typical liquid crystal display ('LCD'), which includes two panels and a liquid crystal layer with dielectric anisotropy disposed therebetween, displays desired images by adjusting the strength of the electric field applied to the liquid crystal layer to control the transmittance of light passing through the panels. The LCD is a representative of flat panel displays ('FPDs'), and one of the LCDs using thin film transistors ('TFTs') as switching elements is widely used.

Meanwhile, in order to increase light efficiency of the LCD, red, green, blue and white subpixel configuration (referred to as 'four color subpixel configuration' hereinafter) that further includes white subpixels in addition to red, green and blue subpixels has been proposed.

In such a four color subpixel LCD, since the number of the subpixels is even, the subpixels representing the same color (referred to as 'the same colored subpixels' hereinafter) appear by unit of even number in a row direction. Therefore, a data driving integrated circuit ('IC') performing a conventional N×1 dot inversion that changes polarities of data voltages each row cannot give the polarity inversion to the same colored subpixels. That is, the same colored subpixels in a row are always supplied with the data voltages with the same polarity.

For example, when the red, green, blue and white subpixels are arranged in a stripe, i.e., red, green, blue, white, red, green, blue, white, . . . in a row direction, a 1×1 dot inversion gives the polarities of +, −, +, −, +, −, +, −, and so on. For red subpixels, the first one has the positive polarity; so has the second.

DISCLOSURE OF INVENTION

Technical Problem

Accordingly, the employment of the conventional data driving ICs to a four color LCD causes horizontal crosstalk and line flicker. For solving these problems, the data driving IC may be designed so that it may perform an inversion such as a 2N×2 inversion. However, even a trivial change of the driving IC causes itself to be made new, and this brings increased cost and reduced yield. Therefore, it is preferable to use commercially available data driving ICs as they are.

Technical Solution

The present invention is directed to provide an LCD capable of performing a polarity inversion for the same colored subpixels without changing conventional data driving ICs.

A liquid crystal display is provided, which includes: a plurality of switching elements arranged in a matrix; a plurality of gate lines connected to the switching elements and transmitting gate signals for turning on or off the switching elements, and a plurality of data lines connected to the switching elements and transmitting data voltages, wherein at least one of the switching elements is connected to the gate line positioned at different side or to the data line positioned at different side in an identical row or an identical column.

A pair of switching elements adjacent above and below are preferably connected to the gate lines therebetween or the gate lines positioned at opposite side each other.

Meanwhile, a pair of switching elements adjacent above and below include a first pair of switching elements connected to the gate line therebetween and a second pair of switching elements connected to the gate lines positioned at opposite side each other. In this case, the first and the second pair of switching elements are preferably adjacent each other and the pair of switching elements may further include a third pair of switching elements connected to the gate line positioned at the same side as and the data line positioned at opposite side with the first pair of switching elements and a four pair of switching elements connected to the gate line positioned at the same side as and the data line positioned at opposite side with the second pair of switching elements, and the third and the fourth pair of switching elements are preferably adjacent each other.

Furthermore, a first switching group comprising the first and the second pair of switching elements and a second switching group including the third and the fourth pair of switching elements may be arranged regularly. In this case, the first and the second switching element groups are preferably arranged regularly in a row direction and the first switching element group may be arranged repeatedly in a column direction.

Meanwhile, the switching element may be a part of subpixel displaying colors, and the subpixels including the switching elements belonging to the first and the second switching groups may display three primary colors and a white color, respectively.

Furthermore, the switching element is a part of subpixel displaying colors, and the subpixels in the same column may display the same color. In this case, the subpixels may display three primary colors, or the subpixels may display three primary colors and a white color.

Meanwhile, the liquid crystal display may further include a data driver applying the data voltage via the data line and performing an N×1 (N is a natural number) dot inversion or a column inversion.

The switching element is a part of subpixel displaying three primary colors and a white color, and the subpixels in the same column preferably display the same color In this case, the four adjacent subpixels respectively displaying three primary colors and a white color may form a pixel; the switching elements belonging to the subpixel are preferably all connected to the data lines positioned at the same side; the switching elements belonging to the subpixels of two pixels adjacent in a row direction are preferably connected to the different gate lines, and the switching elements belonging to the subpixel of two pixels adjacent in a column direction are preferably connected to the gate lines positioned at the same side. Furthermore, the liquid crystal display may further include a data driver applying the data voltages via the data lines and performing a 1×1 dot inversion.

Meanwhile, four adjacent subpixels respectively displaying three primary colors and a white color may form a pixel; the pixel may includes a first and a second pixels adjacent in a row direction; the switching elements belonging to the subpixels of the first pixel and the switching elements belonging to the subpixels of the second pixel are preferably connected to the data lines positioned at opposite side each other, and the switching elements belonging to two subpixels of the subpixels of the first pixel are preferably connected to the gate lines positioned at opposite side each other.

In this case, the switching elements belonging to the subpixels of the second pixel are preferably all connected to the same gate line, and the switching elements belonging to the subpixels of the respective pixels are preferably connected to the data lines positioned at the same side.

Furthermore, the liquid crystal display may further include a data driver applying the data voltages via the data lines and performing a column inversion.

Advantages Effects

The pixel arrangement rule of the present invention enables any inversion including an N×1 apparent inversion to be implemented for a four color LCD and a three color LCD using a conventional data driver performing N×1 inversion.

DESCRIPTION OF DRAWINGS

The present invention will become more apparent by describing preferred embodiments thereof in detail with reference to the accompanying drawings in which:

FIG. 5 shows an exemplary striped subpixel arrangement of an LCD according to an embodiment of the present invention;

FIGS. 6-9 illustrate connecting positions of subpixels in striped arrangements for an LCD according to other embodiments of the present invention;

FIGS. 10 and 11 show exemplary striped subpixel arrangements according to other embodiments of the present invention;

FIG. 12 shows polarities of subpixels upon application of a 2×1 dot inversion to a pixel arrangement shown in FIG. 10;

FIGS. 13, 14A and 14B illustrate connecting positions in mosaic arrangements for an LCD according to embodiments of the present invention;

FIG. 15 shows an exemplary mosaic pixel arrangement according to an embodiment of the present invention;

FIG. 16 illustrates connecting positions of subpixels in an LCD of a mosaic pixel arrangement according to another embodiment of the present invention;

FIG. 17 shows an exemplary pixel arrangement of a mosaic arrangement for an LCD according to another embodiment of the present invention;

FIG. 18 shows an exemplary pixel arrangement of a mosaic arrangement for an LCD according to another embodiment of the present invention; and FIG. 19 shows an exemplary pixel arrangement of a three color pixel arrangement for an LCD according to an embodiment of the present invention.

BEST MODE

The present invention now will be described more fully hereinafter with reference to the accompanying drawings, in which preferred embodiments of the inventions invention are shown. This invention may, however, be embodied in many different forms and should not be construed as limited to the embodiments set forth herein.

Now, LCDs according to embodiments of the present invention will be described with reference to the drawings.

Figure 1:
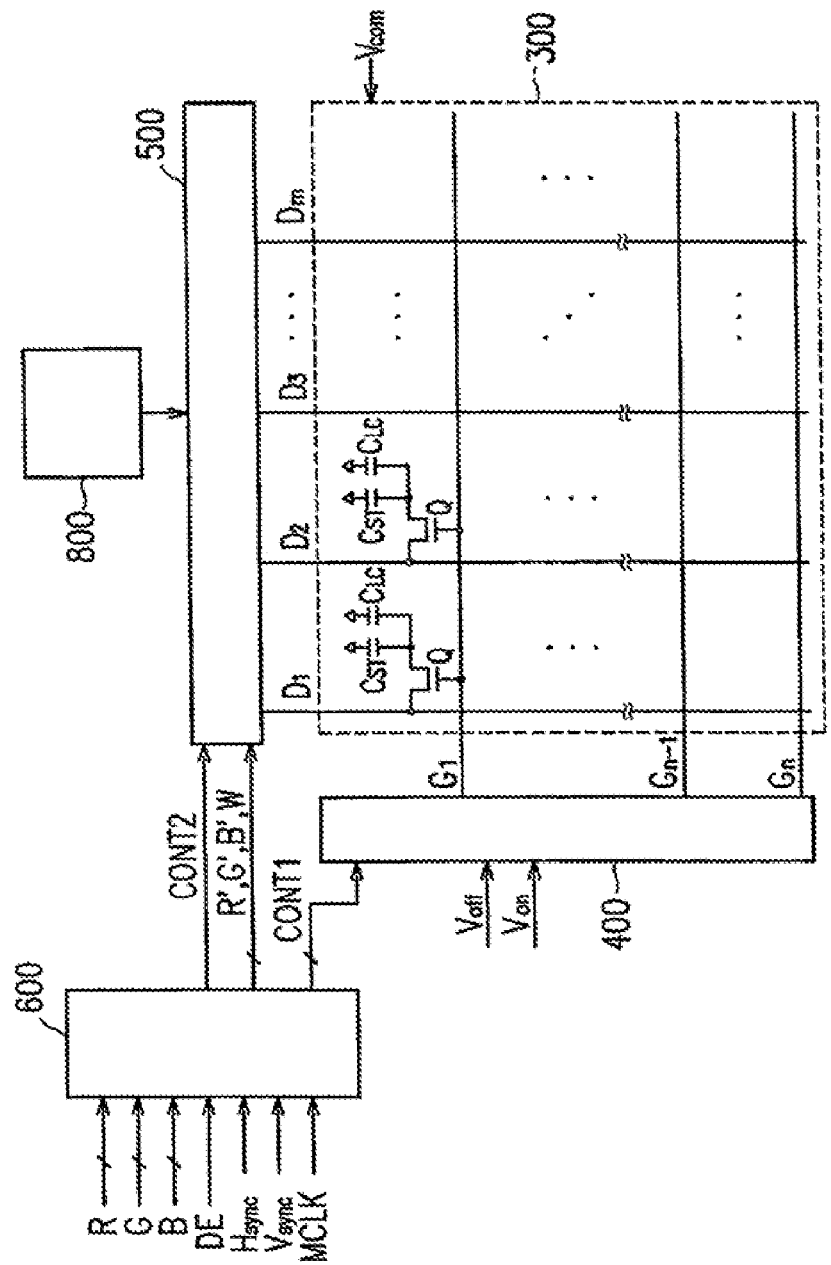
FIG. 1 is a block diagram of an LCD according to an embodiment of the present invention.
Figure 2:
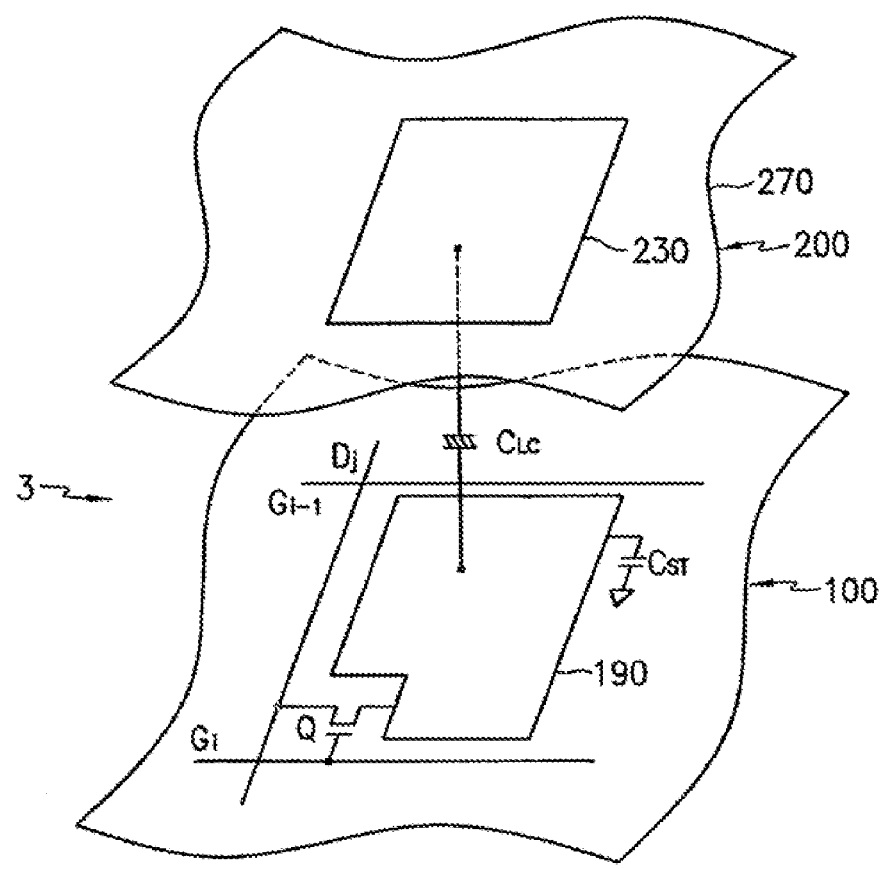
FIG. 2 is an equivalent circuit diagram of a subpixel of an LCD according to an embodiment of the present invention.

FIG. 1 is a block diagram of an LCD according to an embodiment of the present invention, and FIG. 2 is an equivalent circuit diagram of a subpixel of an LCD according to an embodiment of the present invention.

Referring to FIG. 1, an LCD according to an embodiment of the present invention includes a LC panel assembly 300, a gate driver 400 and a data driver 500 connected thereto, a gray voltage generator 800 connected to the data driver 500, and a signal controller 600 controlling the above-described elements.

The LC panel assembly 300, in a structural view shown in FIGS. 2, includes a lower panel 100, an upper panel 200, and a liquid crystal ('LC') layer 3 interposed therebetween while it includes a plurality of display signal lines G1-Gn and D1-Dm and a plurality of subpixels that are connected thereto and arranged substantially in a matrix in circuital view shown in FIGS. 1 and 2.

The display signal lines G1-Gn and D1-Dm are provided on the lower panel 100 and include a plurality of gate lines G1-Gn transmitting gate signals (called scanning signals) and a plurality of data lines D1-Dm transmitting data signals. The gate lines G1-Gn extend substantially in a row direction and they are substantially parallel to each other, while the data lines D1-Dm extend substantially in a column direction and they are substantially parallel to each other.

Each subpixel includes a switching element Q connected to the display signal lines G1-Gn and D1-Dm, and an LC capacitor $C_{LC}$ and a storage capacitor $C_{ST}$ that are connected to the switching element Q. The storage capacitor $C_{ST}$ may be omitted if unnecessary.

The switching element Q such as a TFT is provided on the lower panel 100 and has three terminals: a control terminal connected to one of the gate lines G1-Gn; an input terminal connected to one of the data lines D1-Dm; and an output terminal connected to the LC capacitor $C_{LC}$ and the storage capacitor $C_{ST}$.

The LC capacitor $C_{LC}$ includes a pixel electrode 190 provided on the lower panel 100, a common electrode 270 provided on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage Vcom. Alternatively, both the pixel electrode 190 and the common electrode 270, which have shapes of bars or stripes, may be provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each subpixel represents its own color by providing one of a plurality of color filters 230 in an area occupied by the pixel electrode 190. The color filter 230 shown in FIG. 2 is provided in the corresponding area of the upper panel 200. Alternatively, the color filter 230 is provided on or under the pixel electrode 190 on the lower panel 100.

The color of the color filter 230 is one of the primary colors such as red, green blue, and white. Hereinafter, a subpixel is referred to as red, greed, blue or white subpixel based on the color represented by the subpixel. The white subpixel may have no color filter.

A pair of polarizers (not shown) polarizing the light are attached on the outer surfaces of the panels 100 and 200 of the panel assembly 300.

The gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines G1-Gn of the panel assembly 300 and synthesizes the gate-on voltage Von and the gate off voltage Voff to generate gate signals for application to the gate lines G1-Gn.

The data driver 500 is connected to the data lines D1-Dm of the panel assembly 300 and applies data voltages selected from the gray voltages supplied from the gray voltage generator 800 to the data lines D1-Dm.

The signal controller 600 controls the drivers 400 and 500.

Now, the operation of the LCD will be described in detail.

The signal controller 600 is supplied with three-color image signals R, G and B and input control signals controlling the display thereof such as a vertical synchronization signal Vsync, a horizontal synchronization signal Hsync, a main clock MCLK, and a data enable signal DE, from an external graphics controller (not shown). The signal controller 600 converts the three-color image signals R, G and B into four-color image signals R', G', B' and W and processes and modifies the four-color image signals suitable for the operation of the panel assembly 300 based on the input control signals and the input image signals R, G and B. In addition, the signal controller 600 generates gate control signals CONT1 and data control signals CONT2 for controlling the processed and modified image signals R', G', B' and W. The signal controller 600 provides the gate control signals CONT1 for the gate driver 400, and the processed image signals R', G', B' and W and the data control signals CONT2 for the data driver 500.

The gate control signals CONT1 include a vertical synchronization start signal STV for instructing start of the application of the gate-on voltage Von, a gate clock signal CPV for controlling the output time of the gate-on voltage Von, and an output enable signal OE for defining the duration of the gate-on voltage Von. The data control signals CONT2 include a horizontal synchronization start signal STH for informing of start of a horizontal period, a load signal LOAD or TP for instructing to apply the appropriate data voltages to the data lines D1-Dm, an inversion control signal RVS for reversing the polarity of the data voltages (with respect to the common voltage Vcom) and a data clock signal HCLK.

The data driver 500 receives a packet of the image data R', G', B' and W for a subpixel row from the signal controller 600 and converts the image data R', G', B' and W into the analog data voltages selected from the gray voltages supplied from the gray voltage generator 800 in response to the data control signals CONT2 from the signal controller 600. The data driver 500 then outputs the data voltages to the data lines D1-Dm.

Responsive to the gate control signals CONT1 from the signals controller 600, the gate driver 400 applies the gate-on voltage Von to the gate line G1-Gn, thereby turning on the switching elements Q connected thereto. The data voltages applied to the data lines $D_1$-$D_m$ are supplied to the subpixels through the activated switching elements Q.

The difference between the data voltage and the common voltage Vcom applied to a subpixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure by a unit of the horizontal period (which is indicated by 1H and equal to one period of the horizontal synchronization signal Hsync, the data enable signal DE, and a gate clock signal), all gate lines G1-Gn are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called 'frame inversion'). The inversion control signal RVS may be also controlled such that the polarity of the data voltages flowing in a data line in one frame are reversed (which is called 'line inversion'), or the polarity of the data voltages in one packet are reversed (which is called 'dot inversion').

Now, subpixel arrangements capable of implementing the dot inversion for the same colored subpixels using a data driving IC performing a general N×1 dot inversion including a column inversion will be described in detail with reference to FIGS. 3-19.

As described above, each subpixel is connected to a pair of the gate line G1-Gn and the data line D1-Dm via the switching element Q. A subpixel connected to the i-th gate line Gi and the j-th data line Dj is indicated by (i, j) and a parity of the number (i+j) is indicated by P(i+j). Two subpixels (i, j) and (k, l) are considered.

Let us consider an inversion performed by the data driver 500, which is referred to as a driver inversion.

For a dot inversion in a narrow meaning, i.e., 1×1 dot inversion, the polarities of the two subpixels are equal if P(i+j)=P(k+l), and on the contrary, the their polarities are opposite if P(k+l)≠P(i+j). (1)

For a column inversion, the polarities of the two subpixels are equal regardless of i and j if P(i)=P(j), and on the contrary, the their polarities are opposite if P(i)≠P(j). (2)

For an N×1 (where N is a natural number equal to or more than 2), let i=x1N+y1 and k=x2N+y2 where x1 and x2 are integers and y1 and y2 are equal to 0, 1, 2, . . . , (N−1). The polarities of the two subpixels are equal if P(x1+j)=P(x2+l), and, on the contrary, the their polarities are opposite if P(x1+j)≠P(x2+l). (3)

Inversions of four color subpixels arranged in a stripe and in a mosaic will be described.

1. Striped Arrangement

FIGS. 3-6 show four color subpixel arrangements in striped arrangements. Pixels, each including red, green, blue and white subpixels adjacent in a row direction, are arranged in a row and a column directions.

In these arrangements, assuming that a pair of subpixels representing the same color in two pixels adjacent in a row direction (which are referred to as 'conjugate subpixels' hereinafter) are indicated by (i, j) and (k, l), respectively. Considering that the numbers of the gate lines and the data lines adjacent to and connected to each subpixel are two, respectively, k=i or k=i+1, and l=j+4 or l=(j+4)±1. (4)

The relation k=i means that the conjugate subpixels are connected to the same gate line, and the relation k=i±1 means that they are connected to different gate lines. The relation l=j30 4 means that the conjugate subpixels are connected to the same-sided data lines, and the relation l=(j+4)±1 means that they are connected to opposite-sided data lines.

Since the condition (k, l)=(i, j+4) yields the conventional arrangement, and therefore, it is impossible to obtain an intended inversion with a conventional data driving IC, this condition is excluded.

Accordingly, Relation 4 results in: (k, l)=(i, (j+4)±1) or (i±1, j+4) or (i±1, (j+4)±1). (5)

Figure 3:
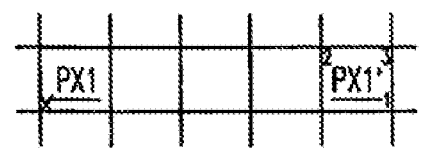
FIGS. 3 and 4 illustrate connecting positions of subpixels in a striped arrangement for an LCD according to an embodiment of the present invention.

FIG. 3 shows three connecting positions of conjugate subpixels PX1 and PX1' satisfying Relation 5, which are represented as the numbers 1, 2 and 3. The position of each number means that the subpixel is connected to a pair of a gate line and a data line that are the closest to the position.

For the connecting position 1, since $P(k+1)=P[i+(j+4)\pm1]=P[(i+j)\pm1].\ne.P(i,j)$ and $P(l)=P[(j+4)\pm1]=P(j\pm1).\ne.P(i,j)$, apparent inversion for each color can be obtained for both the dot inversion and the column inversion of the data driver 500.

For the connecting position 2, since $P(k+1)=P[(i\pm1)+(j+4)]=P[(i+j)\pm1].\ne.P(i,j)$ and $P(l)=P[(j+4)]=P(j)$, apparent inversion for each color can be obtained for the driver dot inversion, but not for the driver column inversion.

For the connecting position 3, since $P(k+1)=P[(i\pm1)+\{(j+4)\pm1\}]=P[(i+j)\pm1]=P(i,j)$ and $P(l)=P[(j+4)\pm1]=P(j\pm1).\ne.P(i,j)$, apparent inversion for all colors can be obtained for the driver column inversion, but not for the driver dot inversion.

In other words, apparent inversion for each color can be obtained when: the conjugate subpixels are located at the connecting positions 1 and 2, that is, they satisfy (k,l)=(i,(j+4)±1) or (i±1, j+4) (6) for the driver dot inversion; and the conjugate subpixels are located at the connecting position 1 and 3, that is, they satisfy (k,l)=(i, (j+4)±1) or (i±1, (j+4)±1) (7) for the driver column inversion.

Meanwhile, a simple pixel arrangement may be obtained by alternately disposing two pixels having different inner subpixel arrangements in a row direction. Two pixels adjacent in a column direction may have the same inner subpixel arrangement or different inner subpixel arrangements. Two pixels having different inner subpixel arrangements include conjugate subpixels and therefore, the two pixels are referred to as 'conjugate pixels' hereinafter.

In the meantime, a primary rule is that a subpixel is uniquely connected to a pair of a data line and a gate line. This means that a pair of a data line and a gate line is connected to only one subpixel and a subpixel is connected to only one pair of a data line and a gate line.

1.1. Single Inner Subpixel Arrangement in Column Direction

In this case, two subpixels adjacent in a row direction are not connected to the same data line.

Figure 4:
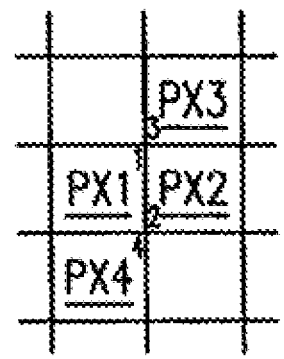

For example, as shown in FIG. 4, when a left subpixel PX1 is connected to a right data line and a right subpixel PX2 is connected to a left data line, the two subpixels PX1 and PX2 need be connected to different gate lines according to the described primary rule (as indicated by connecting positions 1 and 2). Since, in this case, the inner subpixel arrangement in the column direction is equal, a subpixel PX3 just above the subpixel PX2 needs to be connected to a pair of a data line and a gate line located at the same position as those connected to the subpixel PX2 (as indicated by a connecting position 3), and a subpixel PX4 just below the subpixel PX1 needs to be connected to a pair of a data line and a gate line located at the same position as those connected to the subpixel PX1 (as indicated by connecting position 4). Yet, the connecting positions 1 and 3, and 2 and 4 mean that two subpixels PX1 and PX2, and PX2 and PX4 are connected to the same pairs of gate lines and data lines, and thus it violates the described primary rule. Therefore, two subpixels adjacent in a row need to be connected to different data lines.

Since this rule covers all adjacent subpixels, consequently, all the subpixels are connected to the data lines at the same sides thereof.

The case that the same colored subpixels of the adjacent pixels, i.e., the conjugate subpixels are connected to the same-sided data lines exists only in the connecting position 2 among the connecting positions 1, 2 and 3 shown in FIG. 3, and the driver dot inversion may be suitable for this case, but not the driver column inversion. Furthermore, since the connecting position 2 covers all the pixels, a driver N×1 inversion cannot be applied.

To summarize: 1.1.1. All the subpixels are connected to the same-sided data lines; and 1.1.2. Conjugate subpixels are connected to different gate lines.

Figures 5, 6:
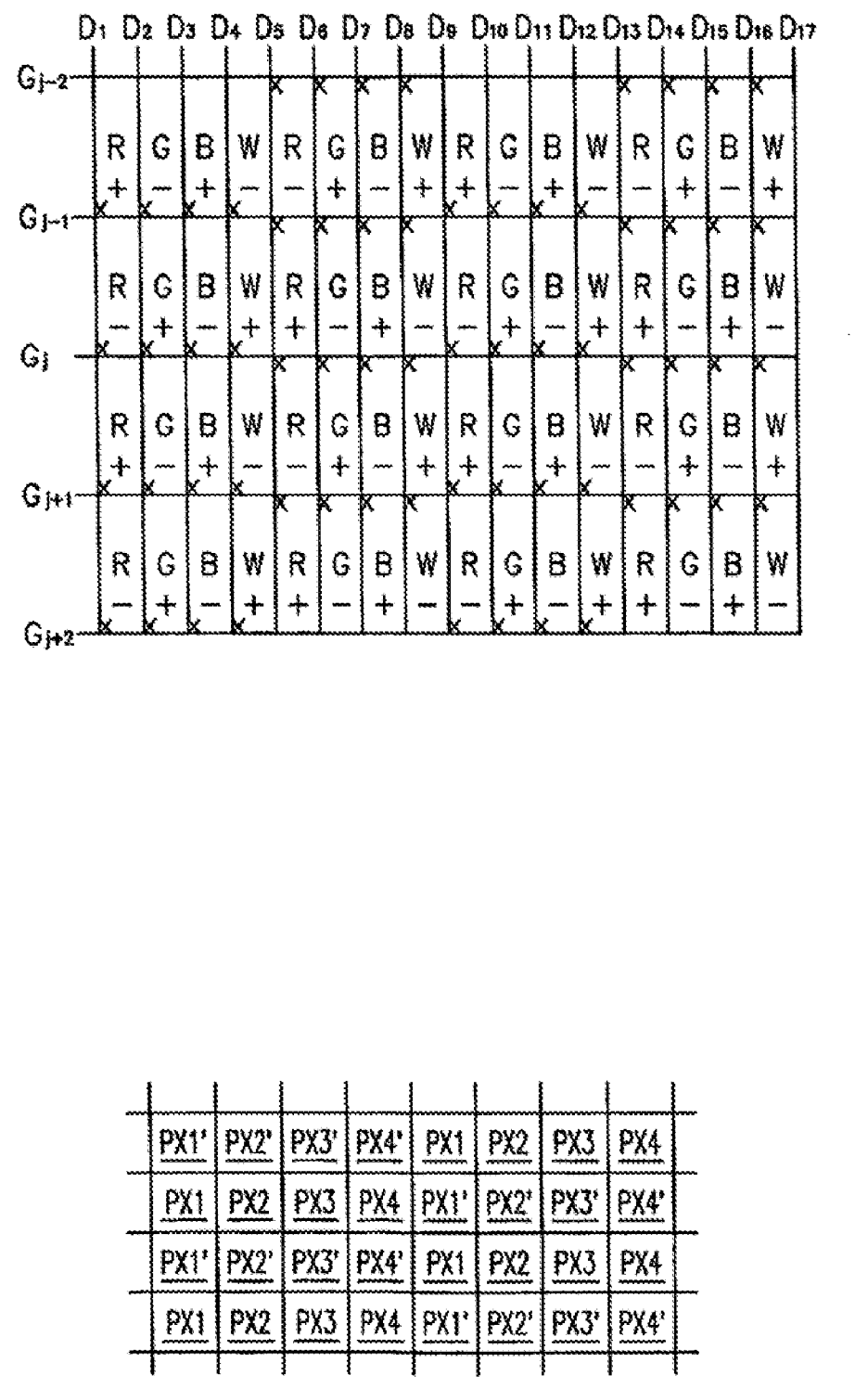

FIG. 5 shows such an exemplary subpixel arrangement. All subpixels are connected to the same-sided data lines, and all subpixels of odd pixels in each pixel row are connected to a lower gate line and all subpixels of even pixels in each pixel row are connected to an upper gate line.

Meanwhile, a connecting position of each subpixel in an even pixel is determined based on a conjugate subpixel in an odd pixel and vice versa. In addition, each subpixel of an odd pixel is connected to either of upper and lower gate lines. Accordingly, the total numbers of possible arrangements are $16 (=2^4)$.

In these arrangements, the adjacent same-colored subpixels are subject to the dot inversion with respect to the common electrode 270, and thus the horizontal crosstalk owing to the common electrode 270 disappears.

1.2. Different Inner Subpixel Arrangements Alternating In Column Direction

This is the case that two pixels having different inner subpixel arrangements are adjacent in the column direction as well as in the row direction.

For example, a pixel including subpixels PX1, PX2, PX3 and PX4 and a pixel including subpixels PX1', PX2', PX3' and PX4' conjugate thereto are repeatedly arranged in the row direction and in the column direction as shown in FIG. 6.

Figure 7:
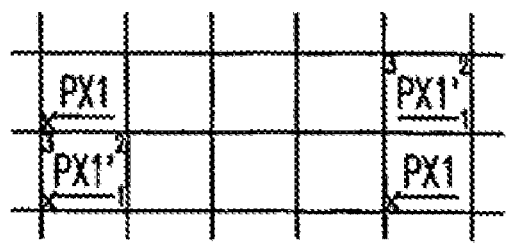

For example, when a connecting position of the subpixel PX1 is indicated by X as shown in FIG. 7, the conjugate subpixel PX1' thereunder has any one of three connecting positions 1, 2 and 3 as can be seen from FIG. 3. However, the connecting position 3 is excluded because it violates the unique connection rule.

Consequently, the conjugate subpixels need to be connected to different-sided data lines and this means that the connecting positions 1 and 3 shown in FIG. 3 are available.

Figure 8:
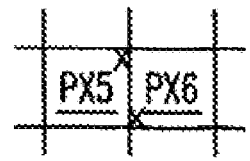

Yet, unless all subpixels in a row are connected to the same-sided data lines, there are two adjacent subpixels PX5 and PX6 connected to the same-sided data lines as shown in FIG. 8. Then, the two adjacent subpixels PX5 and PX6 need to be connected to different gate lines. This requires for at least one of the conjugate subpixel to be connected to different gate lines and different data lines. That is, at least one conjugate subpixel needs to have the connecting position 3 shown in FIG. 3, which will be described in detail.

Figures 9, 10:
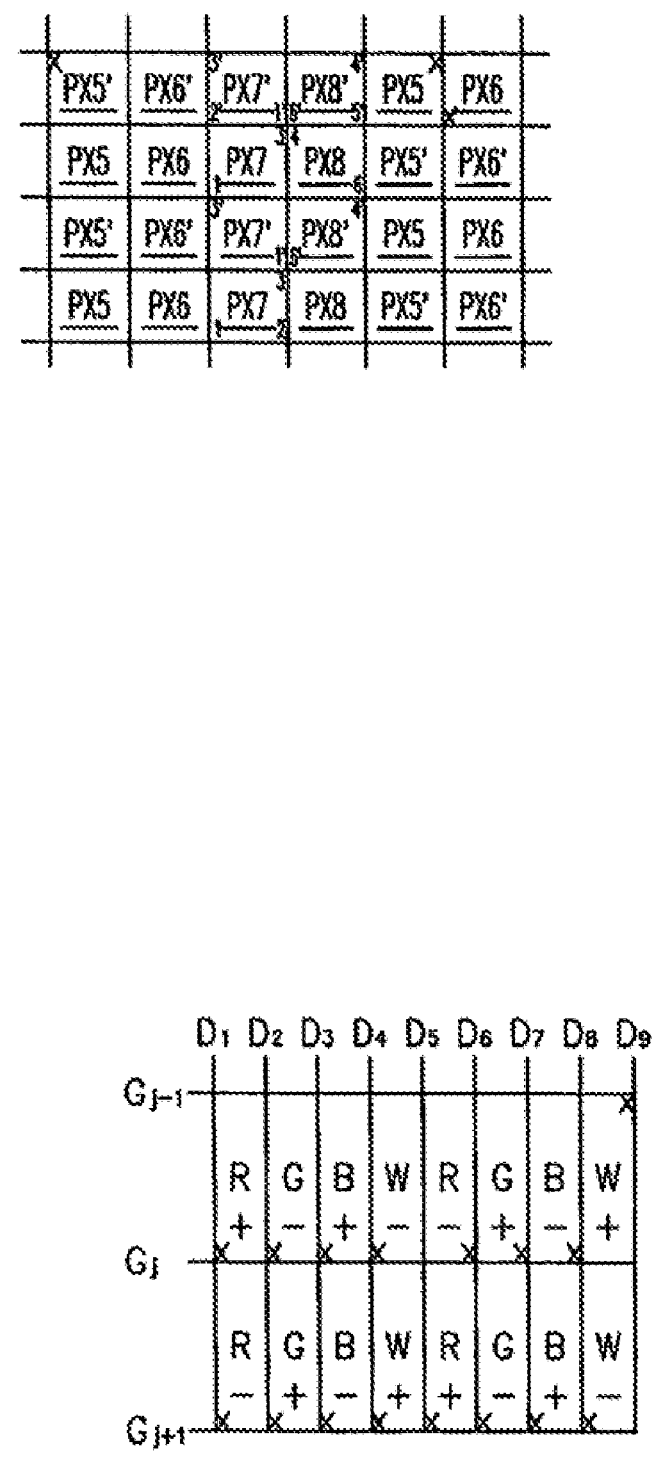

Assuming that all conjugate subpixels have the connecting position 2 shown in FIG. 3 and two adjacent subpixels PX5 and PX6 are connected to the same data line as shown in FIG. 9. Then, the subpixels PX5, PX5', PX6 and PX6' have connecting positions indicated by X.

In this case, possible connecting positions of a subpixel PX7 are 1, 2 and 3 and corresponding connecting positions of a subpixel PX7' conjugate thereto are 1', 2' and 3'. However, since the connecting position 2' of the subpixel PX7' overlaps that of the subpixel PX6', it is excluded. Thus, possible connecting positions of the subpixels PX7 and PX7' are 1 and 1' or 3 and 3'.

Likewise, possible connecting positions of a subpixel PX8 are 4, 5 and 6 and corresponding connecting positions of a subpixel conjugate thereto are 4', 5' and 6'. Since the connecting position 5' of the subpixel PX8' overlaps that of the connecting position of the subpixel PX5', it is excluded. Thus, possible connecting positions of the subpixels PX8 and PX8' are 4 and 4' or 6 and 6'.

If the subpixel PX7 has the connecting position 1, the conjugate subpixel PX7' has the connecting position 1', which overlaps the connecting position 4 of the subpixel PX8 and further overlaps the connecting position 6' of the subpixel PX8'. Thus, the connecting positions 1 and 1' of the subpixels PX7 and PX7' are excluded.

Likewise, since the connecting position 3 of the subpixel PX7 overlaps the connecting position 4 of the subpixel PX8 and the connecting position 6' of the subpixel PX8', the connecting positions 3 and 3' of the subpixels PX7 and PX7' are excluded, too.

This makes no possible connecting position, and thus this is not available.

As a result, at least one conjugate subpixels have the connecting position 3 shown in FIG. 3. This means that the conjugate subpixels having the connecting position 3 shown in FIG. 3 cannot exhibit polarity inversion for a color if the data driver 500 performs the dot inversion.

Therefore, the driver column inversion gives a color-based polarity inversion for all subpixels, while the driver dot inversion does not. Furthermore, since this covers every subpixels of all the rows, a driver N×1 (N is a natural number equal to or more than 2) inversion periodically changing the polarity is not available.

To summarize: 1.2.1. Conjugate subpixels are connected to opposite-sided data lines.

In case of the driver column inversion, the polarities of adjacent subpixels in a pixel are opposite for all the pixel rows, if all the subpixels in a pixel are connected to the same-sided data lines.

1.2.2. All subpixels in a pixel are connected to the same-sided data lines.

Figures 11, 12:
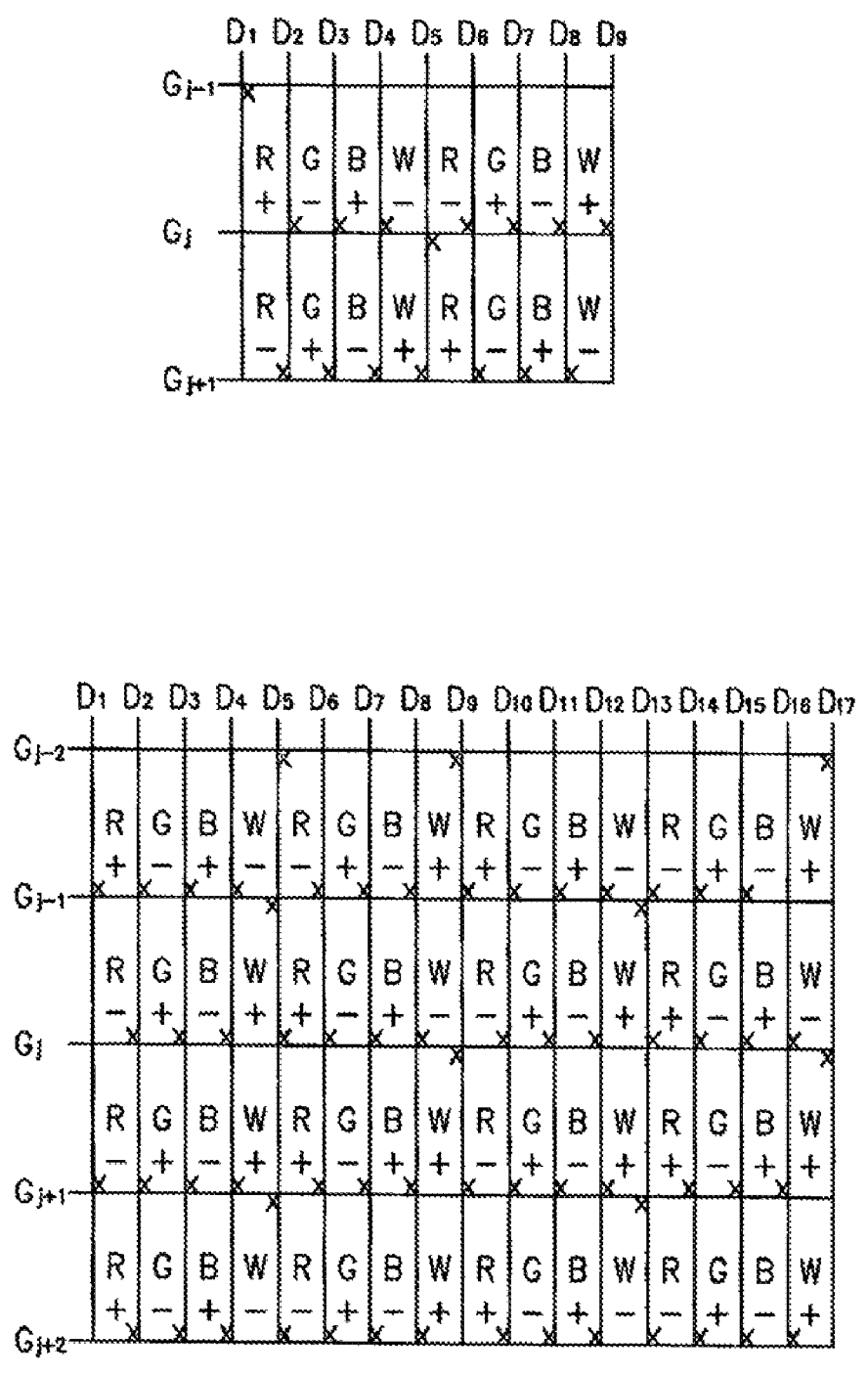

FIGS. 10 and 11 show such examples. Subpixels of adjacent pixels are connected to opposite-sided data lines, and all subpixels in a pixel are connected to the same-sided data lines. FIG. 10 shows an arrangement where subpixels except for a white subpixel W of an even pixel in an odd row or of an odd pixel in an even row are connected to a lower gate line, and FIG. 11 shows an arrangement where subpixels except for a red subpixel R of an odd pixel in an odd row or of an even pixel in an even row are connected to an upper gate line.

Meanwhile, for an arrangement of the first pixel of two adjacent pixels, each subpixel in the second pixel is selectively connected to any one of upper and lower gate lines, and the total number of possible arrangements is 16 ($=2^4$). However, if a connecting position of one of the two adjacent subpixels connected to the same-sided data line is determined, that for the other is also determined according thereto.

For example, as shown in FIG. 10, a leftmost subpixel of an odd pixel in an odd row is connected to the lower gate line Gj, and thus a rightmost subpixel of an even pixel in the odd row needs to be connected to upper gate line Gj−1. Therefore, the actual number of possible arrangements is 8 ($=2^3$). In addition, the subpixels in the first pixel can be selectively connected to one of the upper and the lower gate lines, and thus the total number of possible arrangements is 128 ($=2^4 \times 2^3 = 2^7$).

Meanwhile, a 2M×1 (M=1, 2, ... ) driver inversion gives most pixel conjugates except for some subpixel conjugates the polarity inversion.

FIG. 12 shows an example of apparent inversion for a 2×1 driver inversion applied to the pixel arrangement shown in FIG. 10. Subpixels except for white subpixels W in odd rows exhibit the dot inversion, while all subpixels in even rows exhibit the dot inversion. Concerning the inversion in the column direction, the polarity is inverted every two rows.

In this arrangement, the conjugate subpixels in a pixel column exhibit the dot inversion with respect to the common electrode 270, and thus the horizontal crosstalk owing to the common electrode 270 disappears.

Furthermore, the polarity of conjugate subpixels connected to one gate line is inverted, and thus it is possible to prevent the horizontal crosstalk owing to parasitic capacitance of the gate lines. In case of the example shown in FIG. 5, since all the red subpixels R connected to the gate line Gj have the negative polarity, the crosstalk owing to the parasitic capacitance of the gate lines is not reduced but dispersed up and down. However, the red subpixels R connected to the gate line Gj shown in FIG. 10 alternately exhibit the positive and negative polarities.

This arrangement is expected to reduce the power consumption, which is a merit of the column inversion, and it also prevents the horizontal crosstalk.

Mosaic Arrangement

FIGS. 13-18 show exemplary four color mosaic arrangements.

The mosaic arrangement repeatedly arranges pixels, each including red, green, blue and white subpixels arranged in a 2×2 matrix, in a row direction and a column direction.

Conjugate subpixels are indicated by (i, j) and (k, l). Considering that the numbers of gate lines and data lines that are adjacent to be connected to a subpixel are two, respectively, k=i or k=i±1, and i=j+2 or l=(j+2)±1 (8)

The relation (k, l)=(i, j+2) is excluded as described above.

Since one pixel includes two subpixel rows in the mosaic arrangement, a 2N×1 driver inversion is basically considered, preferably, and a 2×1 driver inversion is assumed to be applied in this embodiment.

Data voltages outputted from the data driver 500 when the gate-on voltage Von is applied to odd gate lines and even gate lines are called odd data voltages and even data voltages, respectively. It is assumed that any odd data voltage and an even data voltage following the odd data voltage have the same polarity. Then, any even data voltage and an odd data voltage following the even data voltage have different polarities.

An odd subpixel row may be connected to a previous (even) gate line or a corresponding odd gate line. Therefore, the odd subpixel rows can be supplied with data voltages having opposite polarities. Hence, the 2×1 inversion for the odd subpixel row can be considered to be the same as the dot inversion. That is, the conjugate subpixels need to satisfy: (k, l)=(i±1, j+2) or (i, j+2±1).

This means that the conjugate subpixels are connected either to different gate lines and the same-sided data lines, or to the same gate line and opposite-sided data lines.

On the contrary, an even subpixel row may be connected to an odd gate line and an even gate line disposed next to the odd gate line, and thus the conjugate subpixels satisfy: l=j+2±1 like the column inversion. This means that the two conjugate subpixels are connected to the opposite-sided data lines.

Figures 13, 14A:
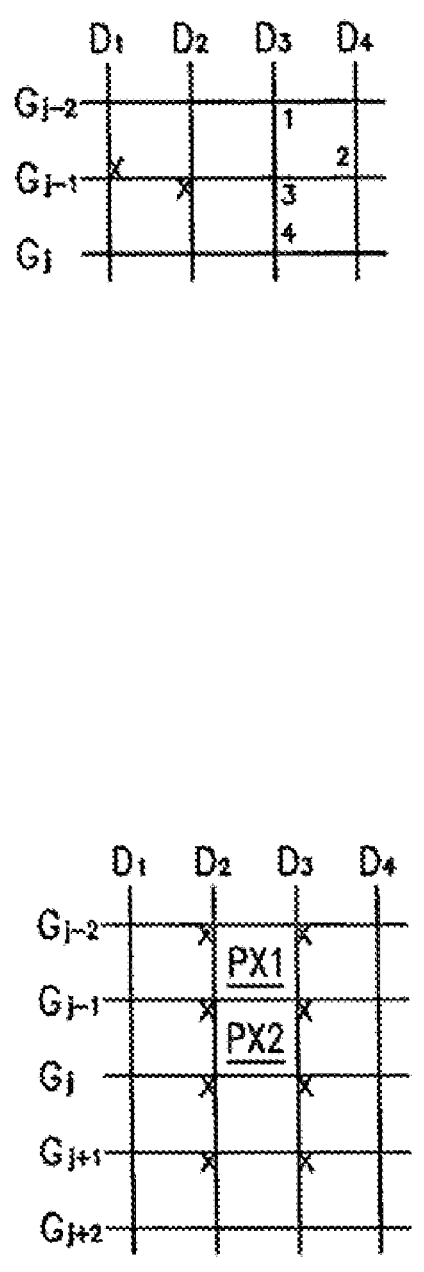

FIG. 13 shows such an example. In this case, a position 1 or 2 is given to a subpixel conjugate to a subpixel of an odd subpixel row, and, a position 3 or 4 is given to a subpixel conjugate to a subpixel in an even subpixel row.

A subpixel row may be either an odd subpixel row or an even subpixel row. Therefore, both the driver dot inversion in a narrow meaning and the driver column inversion need to give a color-based polarity inversion for all subpixels, and in this case, a subpixel arrangement satisfies: (k, l)=(i, j+2±1).

To summarize: 2.1. Conjugate Subpixels are Connected to the Same Gate Line and Opposite-Sided Data Lines.

This is the first important rule in this arrangement.

Referring to FIG. 13, the connecting positions 1 and 3 are excluded.

The second arrangement rule is as follows:

2.2. A Pair of Upper and Lower Subpixels Adjacent to each other are Connected to either a Gate Line Therebetween or Opposite-Sided Gate Lines.

For a simple arrangement, two cases are separately considered, the one that two different subpixel arrangements repeated in a row direction are also repeated in a column direction, and the other that two different subpixel arrangements are repeated in the row direction while the same subpixel arrangement is repeated in the column direction.

First, the case including the same subpixel arrangement in the column direction will be described.

Figures 14B, 15:
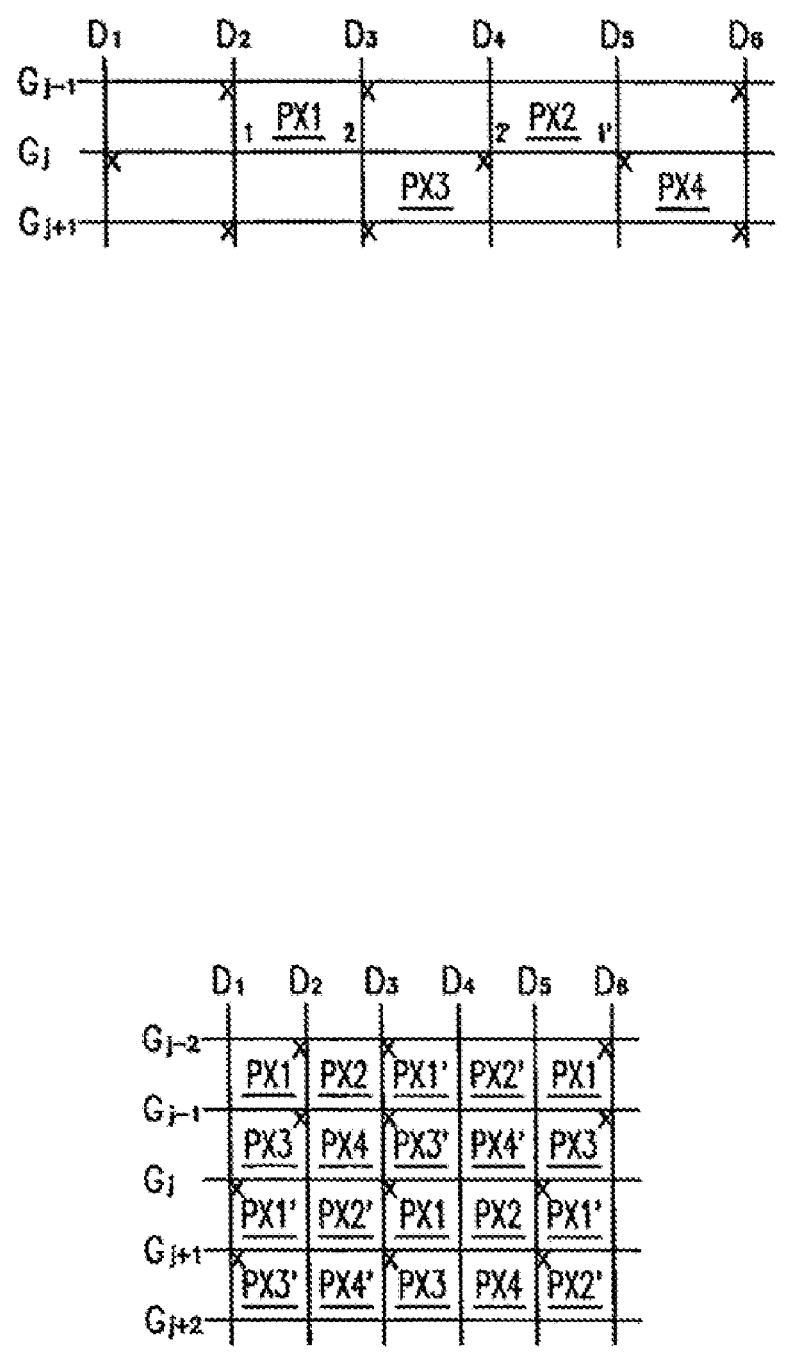

When a pair of upper and lower subpixels adjacent to each other are connected to the same-sided gate lines, there are two cases: all subpixels in a subpixel column are connected to the same data line as shown in FIG. 14A; and they are alternately connected to left and right data lines as shown in FIG. 14B.

Referring to FIG. 14A, all subpixels in one subpixel column are connected to a right data line, and thus all subpixels in a subpixel column conjugate thereto are connected to a left data line. In this case, since there is no pair of a gate line and a data line connected to subpixels PX1 and PX2 in a subpixel column disposed between the conjugate subpixels, this arrangement is not available.

Referring to FIG. 14B, a subpixel PX1 in a second subpixel column in an odd subpixel row need to be connected to a lower gate line Gj (as indicated by connecting positions 1 and 2), and a subpixel PX2 conjugate to the subpixel PX1 also need to be connected to the lower gate line Gj (as indicated by connecting positions 1' and 2'). However, since both data lines D4 and D5 adjacent to the subpixel PX2 form pairs along with the lower gate line Gj to be connected to underlying subpixels PX3 and PX4, no pair of a gate line and a data line do not exist. Thus, this arrangement is neither available.

Therefore, the above-described rule stands, and an exemplary arrangement satisfying such a rule is shown in FIG. 15.

Next, the case that two different subpixel arrangements are repeatedly arranged in the column direction will be described.

Figures 16, 17:
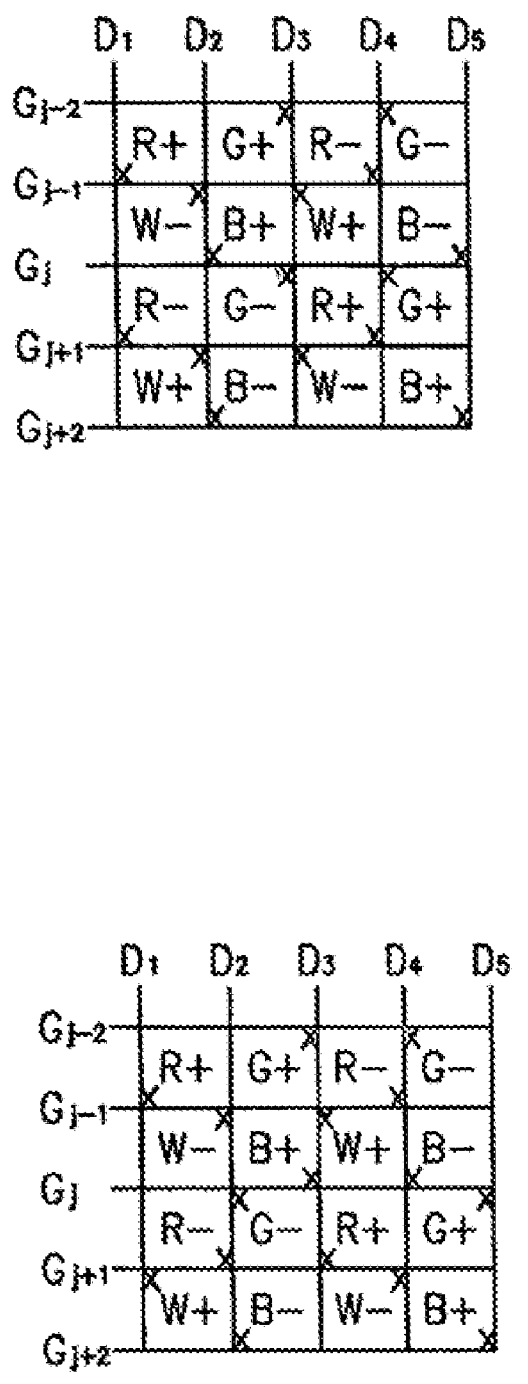

Since conjugate subpixels are always connected to opposite-sided data lines and this arrangement also appears in the column direction, this results in either an arrangement shown in FIG. 16 or an arrangement where an gate line connected to each subpixel in the arrangement shown in FIG. 16 is interchanged with an opposite gate line.

In this case, since there is no pair of a gate line and a data line connected to subpixels PX1 and PX2 in a subpixel column disposed between the conjugate subpixels, this arrangement is not available.

FIG. 17 shows such an exemplary arrangement satisfying such a rule and this arrangement realizes a color-based apparent dot inversion.

To summarize, a successful color-based polarity inversion is obtained by: first, connecting conjugate subpixels to opposite-sided data lines; second, connecting a pair of upper and lower subpixels adjacent to each other are connected to either a gate line disposed therebetween or opposite-sided gate lines, under the primary rule of connecting a subpixel to a gate line and a data line, i.e., under the rule that a subpixel is uniquely connected to a pair of a gate line and a data line.

Then, it is obtained an arrangement that a pair of subpixels in one column among two subpixel columns of each pixel are connected to a gate line disposed therebetween and a pair of subpixels in the other column are connected to opposite-sided gate lines.

The number of subpixel arrangements in a pixel having such a feature is sixteen. In detail, the number of cases that a pair of subpixels in one column are connected to a gate line disposed therebetween is two and the number of cases that a pair of subpixels in the other column are connected to opposite-sided gate lines is four (=2×2), and thus, the number of cases is 8 (=2×4). In addition, there are further two cases: two subpixels in the first column are connected to a gate line disposed therebetween and two subpixels in the second column are connected to opposite-sided gate lines; and vice versa. Therefore, the total number of cases is 16 (=2×8).

The arrangements are implemented in the entire display area according to the following order:

(1) A pair of subpixels (referred to as 'a pair of reference subpixels' hereinafter) respectively belonging to upper and lower subpixel rows (referred to as 'first and second subpixel rows' hereinafter) adjacent to each other are connected to a gate line disposed between the reference subpixels and to opposite-sided data lines.

(2) A pair of subpixels spaced apart from the pair of reference subpixels by an odd number of columns along the row direction are connected to opposite-sided gate lines.

(3) A pair of subpixels spaced apart from the pair of reference subpixels by a multiple of four columns along the row direction are connected to the same gate line as that connected to the pair of reference subpixels and to data lines disposed at the same side as those connected to the pair of reference subpixels.

(4) A pair of subpixels spaced apart from the pair of reference subpixels by an even number, but not a multiple of four, of columns along the row direction are connected to the same gate line as that connected to the pair of reference subpixels and to data lines disposed at opposite sides from those connected to the pair of reference subpixels.

(5) Each pair of subpixels in the second subpixel row and a third subpixel row adjacent thereto or each pair of subpixels in the first subpixel row and a fourth subpixel row adjacent thereto are arranged in the manner described in (1) to (4) but in an alternate manner with the second or the first subpixel row.

(6) The procedures described in (1) to (5) are repeated for other subpixel rows.

In this way, since the same-colored subpixels exhibit the polarity inversion with respect to not only the common electrode 270 but also the gate lines and the data lines, all kinds of crosstalk disappears.

Until now, the data driver 500 has been considered to perform the 2×1 inversion, but a 2N×1 driver inversion gives an N×1 apparent inversion for the same-colored subpixels.

3. Expansion of Arrangement Rule

The application of the above-described rules shown in 2.1 and 2.2 can be expanded to other multi-color LCDs as well as a four color LCD for obtaining various types of inversions.

A pixel including subpixels arranged in a 2×2 matrix has been considered in the described mosaic arrangement, and, now the pixel may be treated as a subpixel group. That is, each subpixel group includes two pairs of subpixels adjacent in a longitudinal direction, one pair of subpixels connected to a gate line disposed therebetween and opposite-sided date lines and the other pair of subpixels are connected to opposite-sided gate lines.

Next, a conjugate subpixel group of the above-described subpixel group is defined in the same manner as the conjugate subpixel in the above-described mosaic arrangement. That is, the conjugate subpixels of the conjugate subpixel group are connected to the same-sided gate lines and opposite-sided data lines.

Assuming that a pair of subpixels in a first column of each subpixel group are connected to the same gate line, and a subpixel in a first row and a first column (referred to a 'first subpixel' hereinafter) is indicated by (i, j).

Since a subpixel in a second row and the first column (referred to as a 'second subpixel' hereinafter) can be indicated by (i, j+1), the polarity of the second subpixel is opposite to that of the first subpixel for an N×1 (N is a natural number) dot inversion and the column inversion.

A subpixel in the first row and a second column (referred to as a 'third subpixel' hereinafter) can be indicated by (i−1, j+1) or (i−1, j+2). The former has the same polarity as the first subpixel and the latter has an opposite polarity to the first subpixel.

A subpixel in the second row and the second column ('the fourth subpixel' hereinafter) can be indicated by (i+1, j+1) or (i+1, j+2). The former has an opposite polarity to and the latter has the same polarity as the second subpixel adjacent to the fourth subpixel in the row direction. In comparison with the third subpixel adjacent to the fourth subpixel in a column direction, if the third subpixel is (i−1, j+1) and the fourth subpixel is (i+1, j+1) or the third subpixel is (i−1, j+2) and the fourth subpixel is (i+1, j+2), the polarities are always the same regardless of the dot and column inversions. If the third subpixel is (i−1, j+1) and the fourth subpixel is (i+1, j+2) or the third subpixel is (i−1, j+2) and the fourth subpixel is (i+1, j+1), the polarity for the dot inversion are opposite and those for the column inversion are the same.

It is possible to obtain intended types of inversions by properly adjusting arrangements of subpixels and conjugate subpixel groups in subpixel groups and driver inversion types in consideration of such polarity relationship. It is noted that one subpixel is uniquely connected to a pair of a data line and a gate line.

This is arranged in the entire display area based on the following order.

(1) A certain pair of subpixels ('a pair of reference subpixels' hereinafter) respectively in upper and lower subpixels adjacent to each other ('the first and the second subpixel rows' hereinafter) are connected to a gate line passing therethrough altogether.

(2) A pair of subpixels apart as an odd column as in a row direction from the pair of reference subpixels are connected to opposite-sided gate lines.

(3) A pair of subpixels located in a position where the polarities are to be changed in a row direction are connected to the same gate line as the pair of reference subpixels and to opposite-sided data lines.

(4) The inversion control signal RVS applied to the data driver 500 is controlled to invert the polarity by intended rows in a column direction.

For example, in the mosaic four color pixel arrangement, the subpixel arrangement in the pixel need not be considered but, instead, the conjugate subpixel arrangement and the driver inversion types are considered only. An alternate arrangement of one set of conjugate pixels in a row direction exhibits an N×1 inversion for a color and that of two sets of conjugate pixels in a row direction exhibits an N×2 inversion. The driver inversion types need to be considered in a column direction. For example, in case of the column inversion or the dot inversion in a narrow meaning, an alternate arrangement of one set of conjugate pixels exhibits a 1×N inversion and that of two sets of conjugate pixels exhibits a 2×N inversion.

Figures 18, 19:
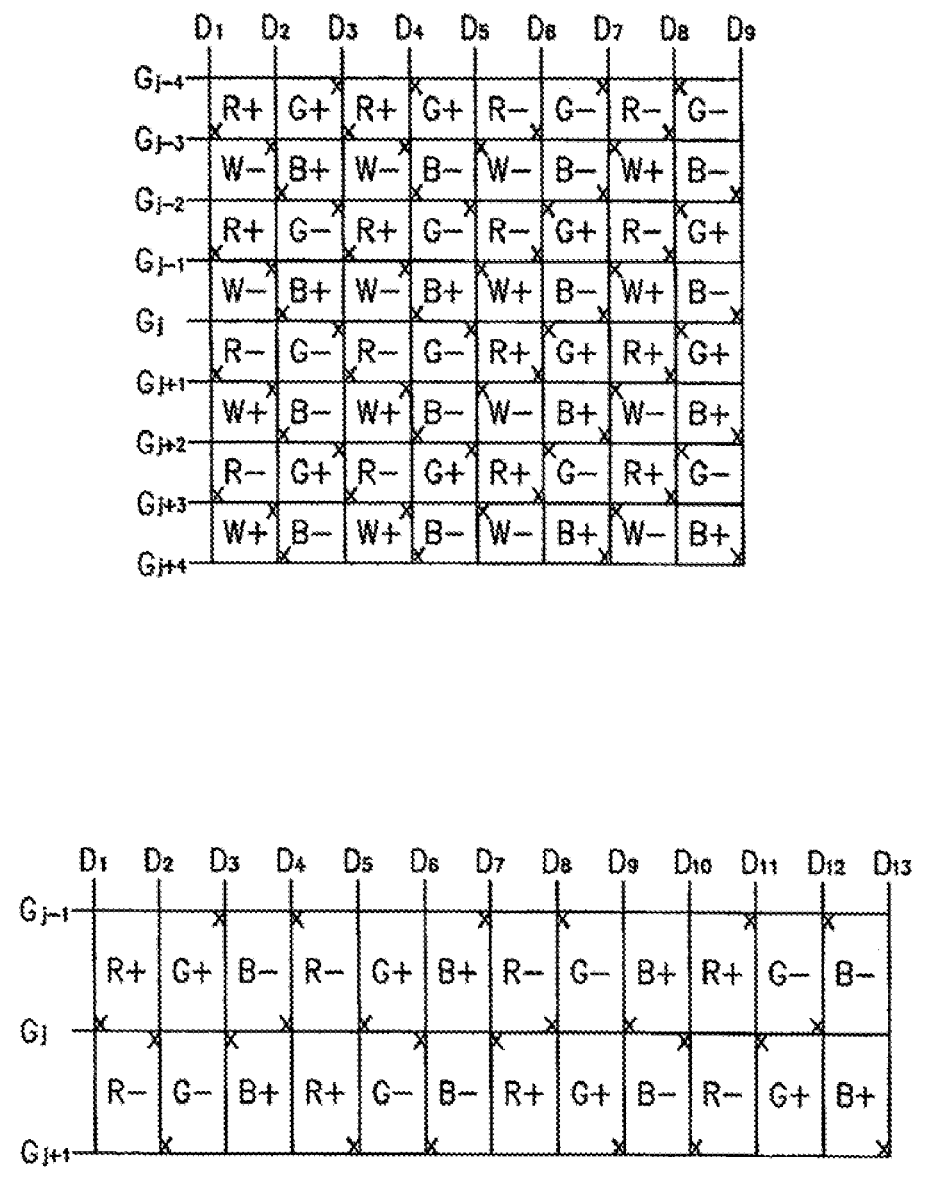

An arrangement that two sets of conjugate pixels are alternately arranged in a row direction and one pixel arranged in a column direction is shown in FIG. 18. The dot inversion which is a driver inversion type exhibits a 2×2 inversion for a color.

This arrangement is available to three color pixel arrangement as well.

For example, when the above-defined first subpixel is indicated by (i, j) and the data driver 500 performs the dot inversion and the third subpixel and the fourth subpixel are indicated by (i−1, j+2) and (i+1, j+1), respectively, the polarities of the adjacent subpixels in the one subpixel group become opposite. Therefore, a repeated arrangement of only the same subpixel groups in a row direction and in a column direction exhibits a 1×1 dot inversion for a color. When the data driver 500 performs the column inversion and the third subpixels and the fourth subpixels are indicated by (i−1, j+1) and (i+1, j+2), respectively, it exhibits a 1×1 dot inversion for a color.

FIG. 19 shows an exemplary exhibition of a 1×2 inversion for each color, which applies the driver column inversion to an alternate arrangement of conjugate subpixel groups in a row direction.

Since subpixels in a row are connected to different gate lines and different colored subpixels are connected to the same data line in the four color LCD having the above-described pixel arrangements of the striped and mosaic arrangements, an arrangement of inputted image data needs to be changed in the signal controller 600 or the data driver 500. For this, the LCD of the striped arrangement needs a line buffer for storing data corresponding to one row and that of the mosaic arrangement needs a line buffer for storing data corresponding to two rows. The inputted data are once stored and rearranged and then outputted using the line buffer.

As described above, the arrangement of the pixel according to the pixel arrangement rule of the present invention enables any inversions including the N×1 inversion to be exhibited in not only the four color pixel arrangement of the striped or the mosaic arrangement but also three colors pixel arrangement and the others using the conventional data driver performing N×1 inversion as it is.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A display device comprising:
   a plurality of gate lines disposed on a substrate, wherein the plurality of gate lines extends in a first direction;
   a plurality of data lines crossing the plurality of gate lines, wherein the plurality of data lines extends in a second direction;
   a group of main pixels, wherein each main pixel of the group of main pixels comprises four sub-pixels arranged in the first direction; and
   wherein a first main pixel of the group of main pixels and a second main pixel of the group of main pixels are adjacent and arranged in the first direction,
   wherein each sub-pixel of the four sub-pixels of each main pixel comprises one of a first color, a second color, a third color, and a fourth color, and
   wherein a polarity sequence in the first direction of sub-pixels in the first main pixel of the group of main pixels and the second main pixel of the group of main pixels comprises (+)(−)(+)(−)(−)(+)(−)(+) in a frame.

2. The display device of claim 1, wherein the each sub-pixel of the first main pixel and the each sub-pixel of the second main pixel are respectively disposed at a same positional relationship within the first main pixel and the second main pixel, respectively and wherein the first color, the second color, the third color and the fourth color are different from one another.

3. The display device of claim 1, wherein a polarity of the first sub-pixel of the first main pixel and a polarity of the first sub-pixel of the second main pixel are different from each other.

4. The display device of claim 3, wherein a third main pixel of the group of main pixels comprises four sub-pixels arranged in the first direction,
   wherein the first main pixel and the third main pixel are adjacent and arranged in the second direction substantially perpendicular to the first direction, and
   wherein the polarity of the first sub-pixel of the first main pixel and a polarity of a first sub-pixel of the third main pixel are different from each other.

5. The display device of claim 4, wherein the each sub-pixel of the first main pixel and the each sub-pixel of the second main pixel are respectively disposed at a same positional relationship within the first main pixel and the second main pixel, respectively and wherein the first color, the second color, the third color and the fourth color are different from one another.

6. The display device of claim 3, wherein a polarity of the fourth sub-pixel of the first main pixel and a polarity of the first sub-pixel of the second main pixel are the same.

7. The display device of claim 4, wherein a polarity of the fourth sub-pixel of the first main pixel and a polarity of the first sub-pixel of the second main pixel are the same.

8. The display device of claim 7, wherein the each sub-pixel of the first main pixel and the each sub-pixel of the second main pixel are respectively disposed at a same positional relationship within the first main pixel and the second main pixel, respectively and wherein the first color, the second color, the third color and the fourth color are different from one another.

9. The display device of claim 8, wherein a third main pixel of the group of main pixels comprises four sub-pixels arranged in the first direction,
   wherein the first main pixel and the third main pixel are adjacent and arranged in the second direction substantially perpendicular to the first direction, and
   wherein the polarity of the first sub-pixel of the first main pixel and a polarity of a first sub-pixel of the third main pixel are different from each other.

10. The display device of claim 9, wherein a polarity of the fourth sub-pixel of the first main pixel and a polarity of the first sub-pixel of the second main pixel are the same.

11. The display device of claim 1, wherein a polarity of the fourth sub-pixel of the first main pixel and a polarity of the first sub-pixel of the second main pixel are the same.

12. The display device of claim 11, wherein the each sub-pixel of the first main pixel and the each sub-pixel of the second main pixel are respectively disposed at a same positional relationship within the first main pixel and the second main pixel, respectively and wherein the first color, the second color, the third color and the fourth color are different from one another.

13. A display device comprising:
    a plurality of gate lines disposed on a substrate, wherein the plurality of gate lines extends in a first direction;
    a plurality of data lines crossing the plurality of gate lines, wherein the plurality of data lines extends in a second direction;
    a group of main pixels, wherein each main pixel of the group of main pixels comprises four sub-pixels arranged in the first direction; and
    wherein a first main pixel of the group of main pixels and a second main pixel of the group of main pixels are adjacent and arranged in the first direction,
    wherein each sub-pixel of the four sub-pixels of each main pixel comprises one of a first color, a second color, a third color, and a fourth color, and
    wherein a polarity of the first sub-pixel of the first main pixel and a polarity of the first sub-pixel of the second main pixel are different from each other.

14. The display device of claim 13, wherein a third main pixel of the group of main pixels comprises four sub-pixels arranged in the first direction,
    wherein the first main pixel and the third main pixel are adjacent and arranged in the second direction substantially perpendicular to the first direction, and
    wherein the polarity of the first sub-pixel of the first main pixel and a polarity of a first sub-pixel of the third main pixel are different from each other.

15. The display device of claim 14, wherein the each sub-pixel of the first main pixel and the each sub-pixel of the second main pixel are respectively disposed at a same positional relationship within the first main pixel and the second main pixel, respectively and wherein the first color, the second color, the third color and the fourth color are different from one another.

16. The display device of claim 13, wherein a polarity of the fourth sub-pixel of the first main pixel and a polarity of the first sub-pixel of the second main pixel are the same.

17. The display device of claim 14, wherein a polarity of the fourth sub-pixel of the first main pixel and a polarity of the first sub-pixel of the second main pixel are the same.

18. A display device comprising:
    a plurality of gate lines disposed on a substrate, wherein the plurality of gate lines extends in a first direction;
    a plurality of data lines crossing the plurality of gate lines, wherein the plurality of data lines extends in a second direction;
    a group of main pixels, wherein each main pixel of the group of main pixels comprises four sub-pixels arranged in the first direction; and wherein a first main pixel of the group of main pixels and a second main pixel of the group of main pixels are adjacent and arranged in the first direction, wherein each sub-pixel of the four sub-pixels of each main pixel comprises one of a first color, a second color, a third color, and a fourth color, wherein the sub-pixels of the first main pixel of the group of main pixels and the sub-pixels of the second main pixel of the group of main pixels have differing polarity sequences, and wherein a polarity of the fourth sub-pixel of the first main pixel and a polarity of the first sub-pixel of the second main pixel are the same.

19. The display device of claim 18, wherein the each sub-pixel of the first main pixel and the each sub-pixel of the second main pixel are respectively disposed at a same positional relationship within the first main pixel and the second main pixel, respectively and wherein the first color, the second color, the third color and the fourth color are different from one another.

20. The display device of claim 18, wherein a third main pixel of the group of main pixels comprises four sub-pixels arranged in the first direction, wherein the first main pixel and the third main pixel are adjacent and arranged in the second direction substantially perpendicular to the first direction, and wherein the polarity of the first sub-pixel of the first main pixel and a polarity of a first sub-pixel of the third main pixel are different from each other.

* * * * *